(12) United States Patent
Malone

(10) Patent No.: US 7,089,645 B2
(45) Date of Patent: Aug. 15, 2006

(54) METHOD OF MANUFACTURING A HIGH PRESSURE FLUID QUICK CONNECT

(75) Inventor: David S. Malone, Attica, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/964,177

(22) Filed: Oct. 13, 2004

(65) Prior Publication Data

US 2005/0044710 A1    Mar. 3, 2005

Related U.S. Application Data

(62) Division of application No. 10/183,266, filed on Jun. 25, 2002, now Pat. No. 6,857,667.

(51) Int. Cl.
    *B23P 11/00* (2006.01)
(52) U.S. Cl. .............................. 29/510; 29/511; 29/516; 29/434; 285/33; 285/34; 285/35; 285/286.2
(58) Field of Classification Search ............... 29/510, 29/511, 516, 434; 285/33, 34, 35, 286.2
    See application file for complete search history.

(56) References Cited

U.S. PATENT DOCUMENTS

| | | |
|---|---|---|
| 1,861,372 A | 5/1932 | Waters |
| 2,476,172 A | 7/1949 | Williams |
| 2,823,934 A | 2/1958 | Gorrell |
| 3,279,835 A | 10/1966 | Krohm |
| 3,389,923 A | 6/1968 | Love et al. |
| 3,441,293 A * | 4/1969 | Bagnulo .................. 285/50 |
| 3,773,360 A | 11/1973 | Timbers |
| 3,922,011 A | 11/1975 | Walters |
| 4,216,982 A | 8/1980 | Chow |
| 4,433,861 A | 2/1984 | Kreczik |
| 4,637,636 A | 1/1987 | Guest |
| 4,657,286 A | 4/1987 | Guest |
| 4,749,214 A | 6/1988 | Hoskins et al. |
| 4,772,051 A | 9/1988 | Mann |
| 4,842,309 A | 6/1989 | LaVene et al. |
| 4,850,622 A | 7/1989 | Suzuki |
| 5,022,687 A * | 6/1991 | Ariga .................. 285/321 |
| 5,048,874 A | 9/1991 | Ohlsson |
| 5,176,413 A | 1/1993 | Westman |
| 5,448,804 A | 9/1995 | Warren |

(Continued)

FOREIGN PATENT DOCUMENTS

GB    2 103 744 A    2/1983

*Primary Examiner*—George Nguyen
*Assistant Examiner*—Christopher K. Agrawal
(74) *Attorney, Agent, or Firm*—Young & Basile, P.C.

(57) ABSTRACT

A method of forming a fluid quick connect includes steps forming a housing having a split end retainer slidably mounted in a recess in at least one end of the housing. A first angular recess is formed in the housing adjacent the first end. The first recess communicates with a bore extending from the first end of the housing. The retainer is captured in the recess by deforming an extension of the first end of the housing angularly inward. In one aspect, a conical surface is formed inward of the extension to form the recess in conjunction with the deformed extension. The retainer and recess may be used at one end of the housing for connection with one endform or at both ends of the housing to fluidically couple two endforms.

17 Claims, 5 Drawing Sheets

U.S. PATENT DOCUMENTS

| | | |
|---|---|---|
| 5,498,042 A | 3/1996 | Dole |
| 5,516,157 A | 5/1996 | Williamson |
| 5,542,717 A | 8/1996 | Rea et al. |
| 5,573,279 A | 11/1996 | Rea et al. |
| 5,607,190 A | 3/1997 | Exandier et al. |
| 5,662,359 A | 9/1997 | Kargula |
| 5,681,060 A | 10/1997 | Berg |
| 5,681,062 A | 10/1997 | Fukao et al. |
| 5,730,475 A | 3/1998 | Kargula |
| 5,887,911 A | 3/1999 | Kargula |
| 5,934,709 A | 8/1999 | Morrison |
| 5,954,373 A | 9/1999 | Sorkin |
| 5,992,515 A | 11/1999 | Spiegel |
| 6,106,031 A | 8/2000 | Guginsky |
| 6,231,090 B1 | 5/2001 | Fukao et al. |
| 6,390,511 B1 * | 5/2002 | Kargula ............... 285/308 |

* cited by examiner

METHOD OF MANUFACTURING A HIGH PRESSURE FLUID QUICK CONNECT

CROSS-REFERENCE TO CO-PENDING APPLICATION

This application is a divisional application of U.S. patent application Ser. No. 10/183,266, filed Jun. 25, 2002 now U.S. Pat. No. 6,857,667, the entire contents of which is incorporated herein in its entirety.

BACKGROUND

The present invention relates, in general, to fluid quick connectors which couple fluid components.

Snap-fit or quick connectors are employed in a wide range of applications, particularly, for joining fluid carrying conduits in automotive and industrial applications. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

In brake fluid connections, the high pressure brake lines typically employ threaded connections for connecting two high pressure lines together. A male and female threaded connection must be properly aligned and tightened to the specified torque. This involves care in assembly which adds to the overall assembly time.

It would be desirable to provide a fluid quick connect for use in high pressure applications which eliminates the need for assembly tools to complete the connection.

It would still be desirable to provide a fluid quick connect which is useful in high pressure applications to provide an easy and convenient fluid connection to interconnected fluid elements, such as an interconnection between a brake line and a mating housing, caliper or fluid or reservoir.

SUMMARY

A method of manufacturing a high pressure fluid quick connect includes the steps of:
forming a body having a through bore extending from an open end;
forming a recess adjacent the open end of the body;
capturing a retainer in the recess of the body;
the method also includes the step of forming a conical surface at the open end of the body;
disposing the retainer over the conical surface; and
deforming an extension of the body, initially spaced from the conical surface, into a spaced relationship with the conical surface to form a recess capturing the retainer in the body.

The fluid quick connector made by the method of the present invention can be advantageously employed in high pressure fluid coupling applications without the need for the typical threaded connection between an endform and the connector. This eliminates the need for special assembly tools thereby simplifying and reducing the cost of assembling the fluid quick connect of the present invention. The retainer employed in the inventive fluid quick connect may also be employed at the both ends of a housing to form a single point connection between the endforms on two tubular conduits.

The present high pressure fluid quick connect provides a low cost fluid coupling solution to high pressure fluid connections, a fluid coupling in which the connector can be installed in a quality controlled environment on a use element, and a fluid connection that does not require assembly tools at the end customer to complete the connection.

BRIEF DESCRIPTION OF THE DRAWING

The various features, advantages and other uses of the present invention will become more apparent by referring to the following detailed description and drawing in which.

DETAILED DESCRIPTION

Figure 1:
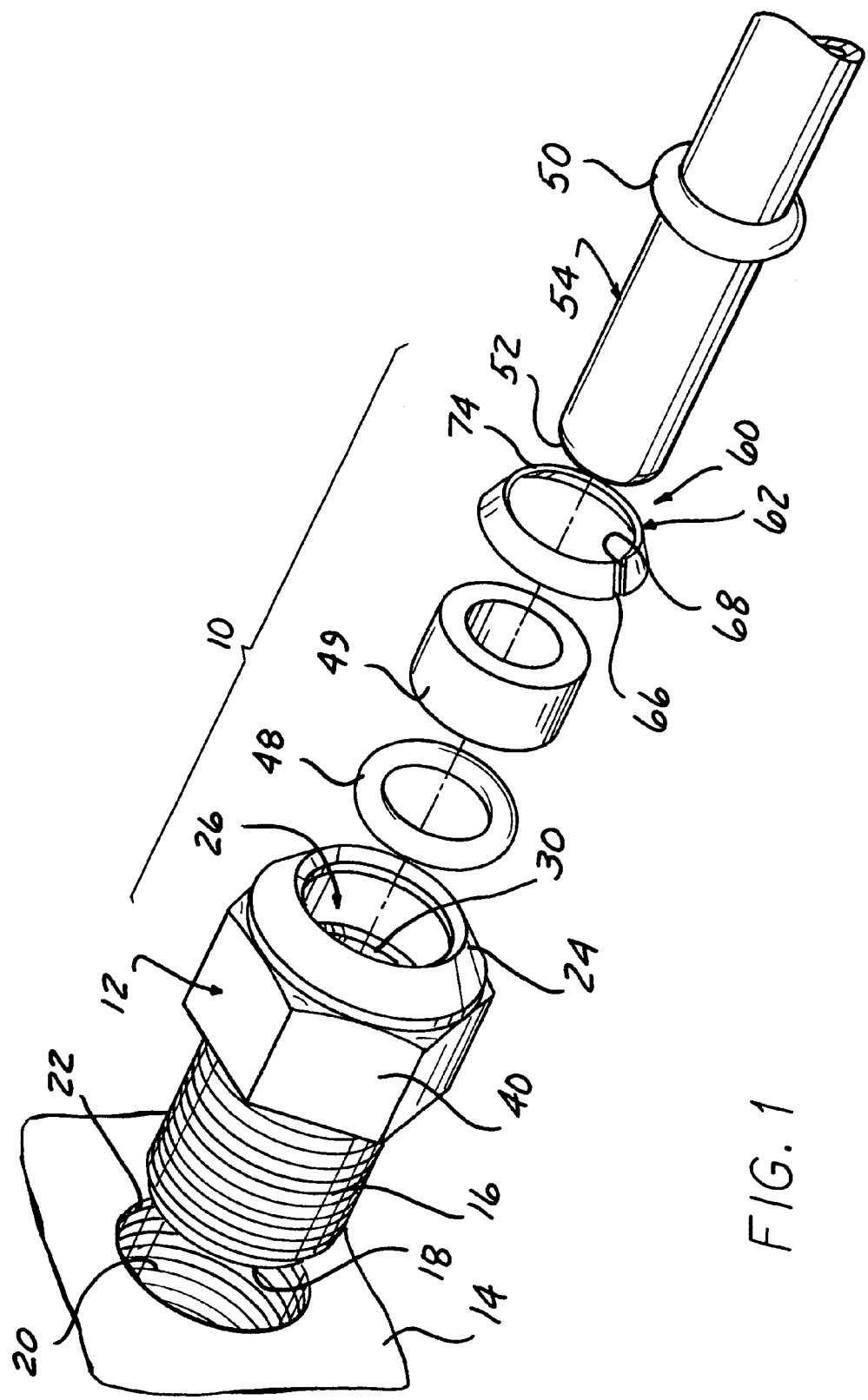
FIG. 1 is an exploded, perspective view of one aspect of a fluid quick connect according to the present invention.

Referring now to the drawing, and to FIGS. 1–6 in particular, there is depicted one aspect of a fluid quick connect 10 according to the present invention. Although the fluid quick connect 10 may be employed in many diverse high pressure, fluid applications, it will be understood that the following description of the fluid quick connect 10 in a high pressure vehicle brake line application is by way of example only. Further, the term "fluid" used in connection with the present invention will be understood to encompass any liquid, such as fuel, water, for example, and, also, any gas or vapor.

The fluid quick connect 10 includes a housing 12 which is attachable to a fluid operative device 14, such as a brake line terminal, caliper, brake fluid reservoir, ABS housing, etc. Although the housing 12 is provided with external threads 16 extending from a first end 18 for threaded attachment with mating threads 20 in a bore 22 in the fluid operative device 14, it will be understood that the fluid quick connect 10 of the present invention may employ a housing which is integrally formed as a one-piece extension of the fluid operative device 14. The housing 12 is formed of a suitable high strength material, such as metal, or a high strength plastic, etc.

As shown in FIG. 1 and in greater detail in FIGS. 2A–5, the housing 12 also includes a second end 24 with a through bore 26 extending completely from the second end 24 to the first end 18.

By way of example only, the bore 26 is in the form of a stepped bore having a first diameter end bore portion 30, an intermediate, smaller diameter bore portion 32, and a yet smaller diameter second end bore portion 34.

A plurality of flats, such as hex flats 40, are formed externally on the housing 12 adjacent the second end 24. The flats 40 provide for threading attachment of the housing 12 in the bore 22 in the fluid operative device 14. However, it would be understood the provision of the flats 40 is by way of example only as the housing 12 may be effectively utilized without the flats 40.

Figure 2A:
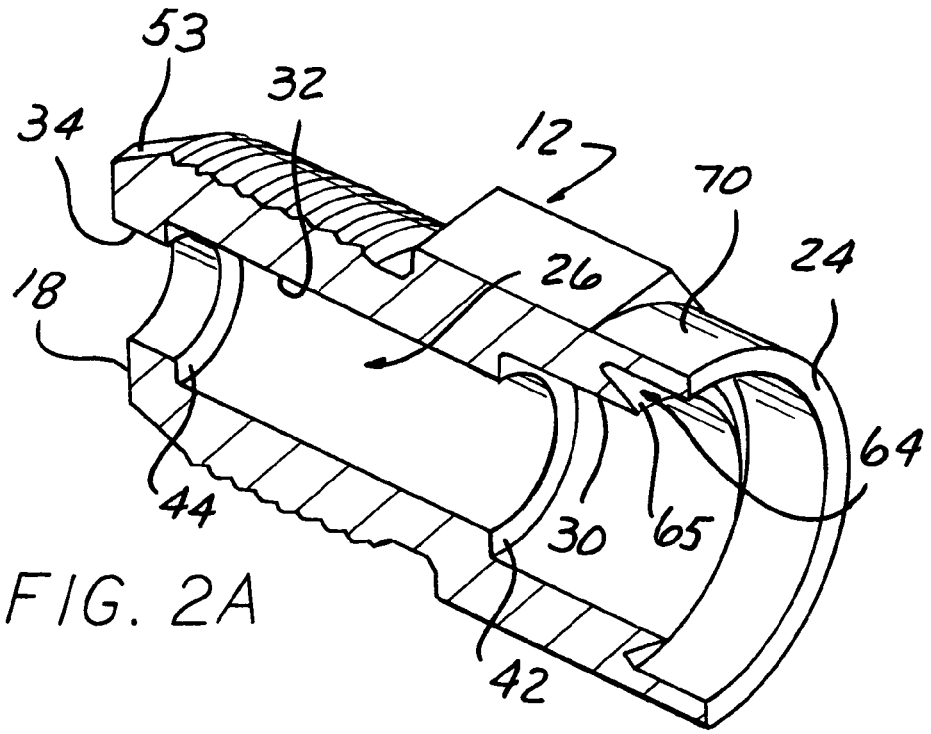
FIG. 2A is a longitudinal cross-sectional, perspective view of the housing of the fluid quick connect shown in FIG. 1, depicted in a preassembled state.
Figure 2B:
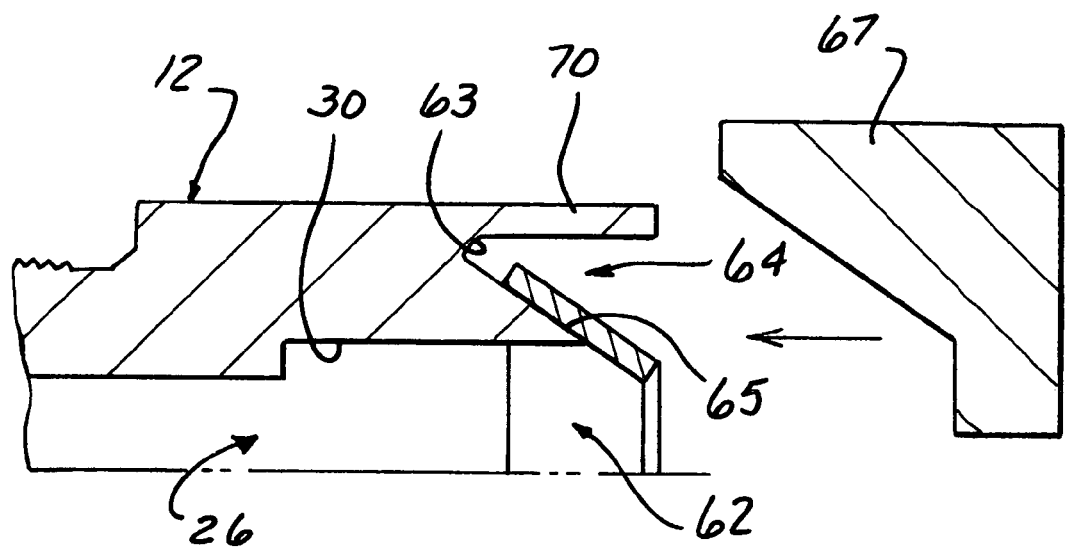
FIGS. 2B and 2C are side cross-sectional views of the process for forming the recess in the quick connect housing.

As shown in FIGS. 2A, 2B and 4, an annular shoulder or angled flat 42 is formed at the juncture of the first end bore portion 30 and the intermediate bore portion 32. Similarly, a second annular shoulder 44 is formed at the juncture of the other end of the intermediate bore portion 32 and the second end bore portion 34. The first end bore portion 30 is designed to receive at least one seal member 48, such as an O-ring, an optional sleeve or top hat 49, press fit in the bore portion 30 and enlarged, annular flange or bead 50 spaced from a tip end 52 of an endform, tube or conduit 54. The shoulder 42 acts as a seat for insertion of the O-ring 48, the top hat 49, and the annular flange 50, with the top hat 49 acting as an insertion limit or stop for the flange 50 of the endform 54 as shown in FIG. 4. The top hat 49 is press fit in the bore portion 30 to retain the O-ring portion 48 in the bore portion 30.

Figure 2C:
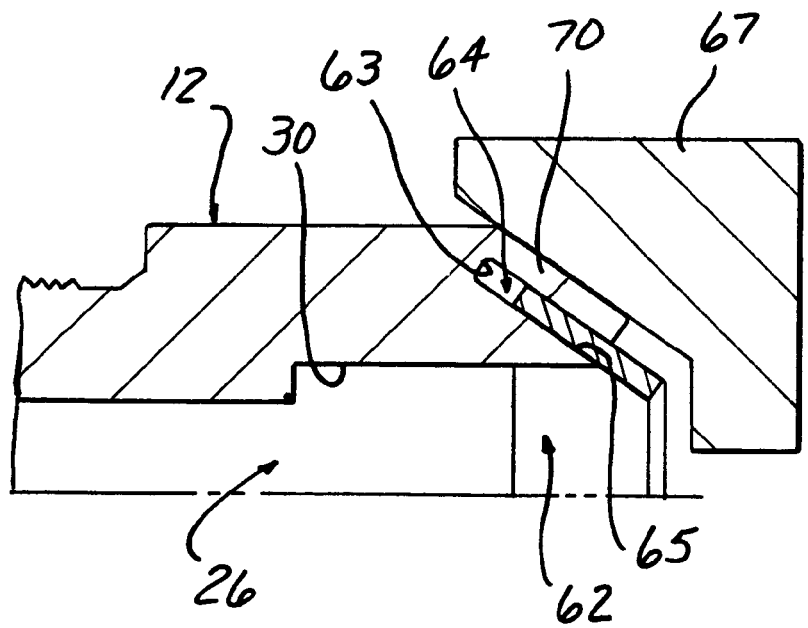
Figure 3A:
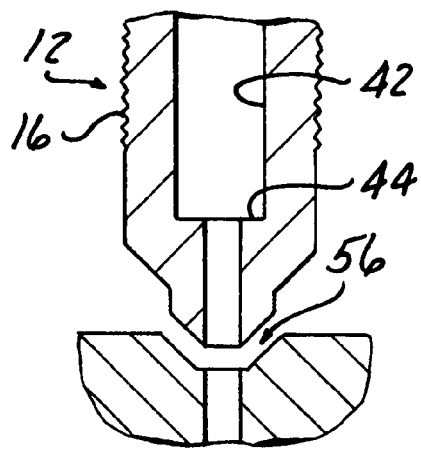
FIGS. 3A and 3B are partial, longitudinal cross-sectional, perspective views of different terminal ends of the housing of the fluid quick connect shown in FIG. 1.
Figure 3B:
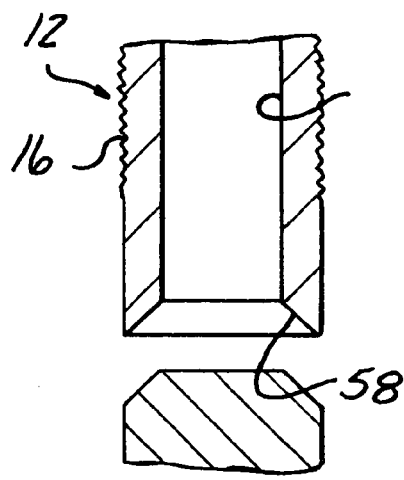

As shown in FIGS. 1, 2, 3A and 3B, the first end 18 of the housing 12 has a conical end shape denoted by reference number 53. Enhanced sealing with a conical seat formed in certain fluid operative devices 14 at the end of the bore 20 may be provided by mating annular surfaces formed on the first end 18 of the housing as shown in FIGS. 3A and 3B. In FIG. 3A, the first end of the housing 12 has a machined or precision formed, internal, conical seat 56 designed to mate with a complementary annular conical formed in the fluid use device 14. In FIG. 3B, first end of the housing 12 has an inverted, annular, conical shape surface 58 designed to mate with the external surface of a seat formed in the fluid operative device 14.

The fluid quick connect 10 includes a retainer means 60 formed of a retainer clip 62 movable mounted in an annular recess 64 formed in the first end 24 of the housing 12.

The retaining clip 62 is formed of a suitable spring or resilient material, such as spring metal. As shown in FIG. 1 the retaining clip 62, hereafter referred to simply as the clip 62, has a conical shape with a discontinuity or a split forming first and second ends 66 and 68, respectively. The discontinuity or split allows the first and seconds ends 66 and 68 to spread apart during engagement of the clip 62 with the annular flange 50 on the endform 54 during insertion of the endform 54 into the bore 26 in the housing 12.

The recess 64 is disposed at an angle with respect to the longitudinal axis of the bore 26. One sidewall 70 of the housing 12 forming one side of the recess 64 is initially formed parallel to the longitudinal axis of the bore 26 as shown in the preassembled state of the housing 12 in FIGS. 2A and 2B. This allows the clip 62 to be inserted through the first end 24 of the housing 12 into the recess 64, see FIG. 2B.

Figure 5:
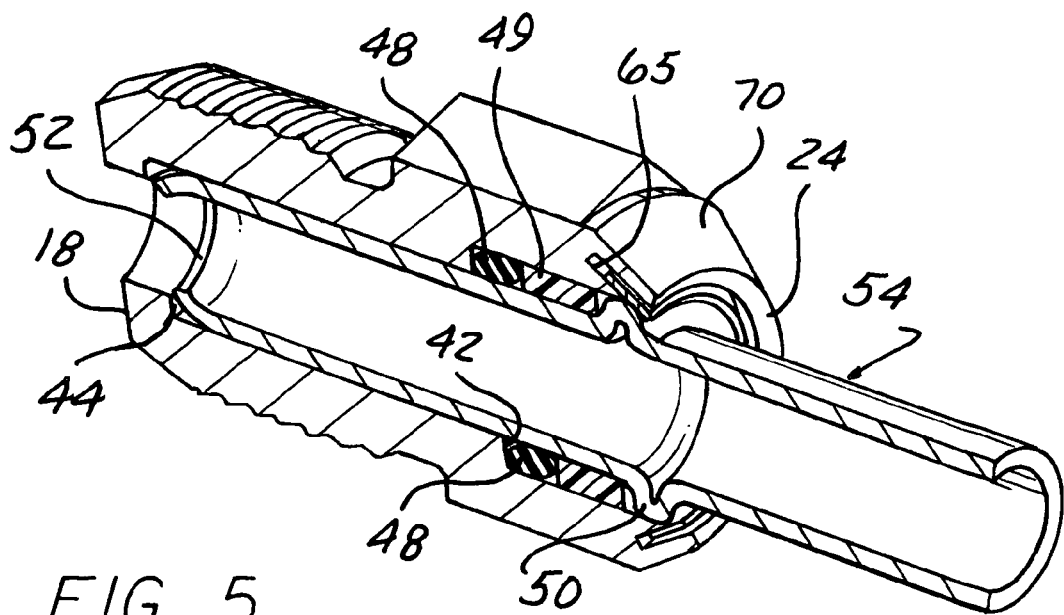
FIG. 5 is a longitudinal cross-sectional, perspective view of the fluid quick connect of FIG. 1 depicted in an assembled state.
Figure 6:
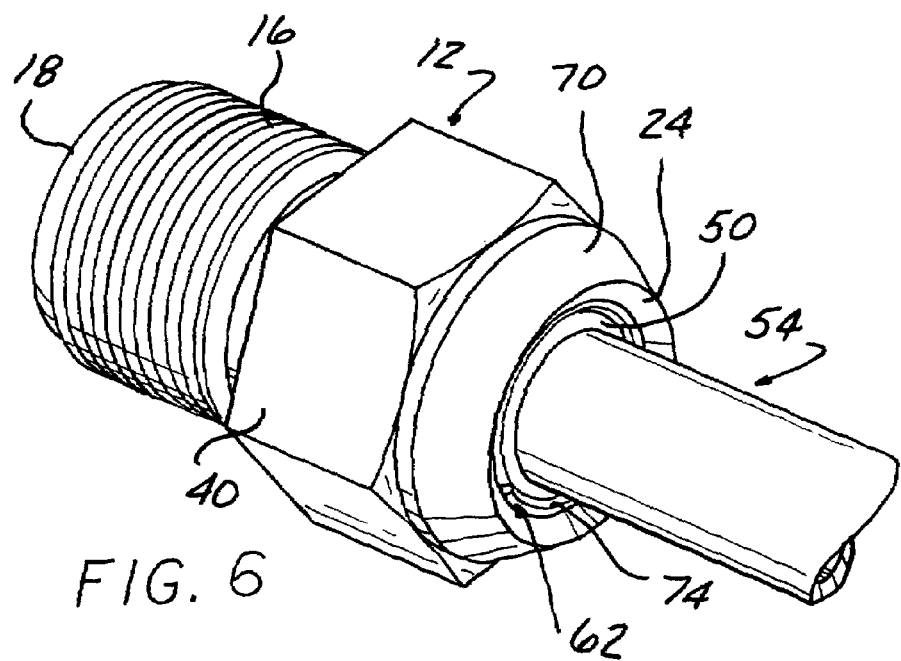
FIG. 6 is an exterior, perspective view of the assembled fluid quick connect shown in FIG. 5.

The sidewall 70 is then formed, such as by swaging, into a conical position generally parallel to the opposed wall 65 of the recess 64, as shown in FIGS. 2C, 5 and 6, by advance of a suitably formed tool or die 67. Thus, the walls 70 and 65 are disposed in parallel to define the conical annular recess 64 in which the clip 62 is trapped; but still capable of sliding moving as described hereafter.

The width of the recess 64 is determined by the width of a flat 63 formed at one end of the wall 65 as well as the length of the wall 70. The interface of the tool or die 67 will bend the wall 70 radially inward to the position shown in FIG. 2C wherein the wall 70 is parallel to the wall surface 65 as described above.

The recess 64 as well as the shape of the clip 62 have been defined as being generally conical. However, it will be understood that other shapes, including a polygonal shape, i.e., square, recess, etc., and a complimentary formed clip may also be employed as the angular shape of the recess need only be capable of deforming or bending the resilient material of the clip 62 as the clip 62 moves within the recess 64 by interaction with the annular flange 50 on the endform 54 to cause energy to be stored in the clip 62 by deformation or bending. It is this energy, when released by the sliding insertion of the flange 50 past the leading edge 74 of the clip 62 which will cause the clip 62 to return to its normal position in the recess 64 latching the endform in the housing.

The resiliency of the clip 62 will normally bias the clip 62 to the smallest inner diameter with the closest spacing between the first and second ends 66 and 68. This will cause the clip 62 to slide downwardly in the recess 64 until the leading edge 74 projects a short distant outwardly from the open end of the recess 64 in the housing 12 as shown in FIG. 2C.

Figure 4A:
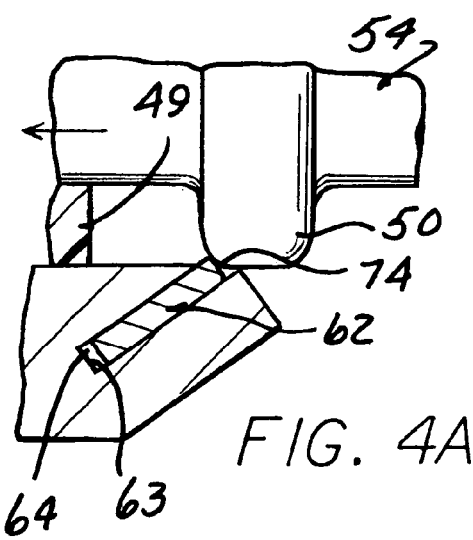
FIGS. 4A and 4B are enlarged, side elevational, cross-sectional views showing the movement of the retainer between first and second positions.

As the tip end 52 of the endform 54 is inserted into the bore 26 in the in the housing 12, the leading edge of the annular flange 50 on the endform 54 will contact the leading edge 74 of the clip 62 and force the clip 62 to slide angularly outward further into the recess 64 as shown in FIG. 4A. This angular sliding movement of the clip 62 is accompanied by a reversible deformation or separation of the first and second ends 66 and 68 which causes energy to be stored in the clip 62 as it is held in the expanded position shown in FIG. 4A within the recess 64 in the housing 12 by contact with the flange 50.

Figure 4B:
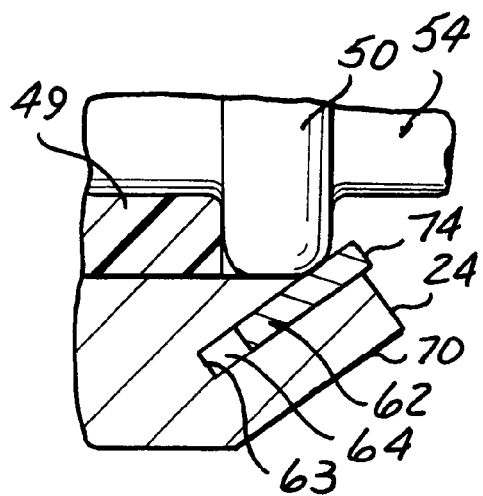

As insertion of the endform 54 into the bore 26 in the housing 12 continues, the outermost surface of the annular flange 50 on the endform 54 will pass beyond the leading edge 74 of the clip 62. At this time, as shown in FIG. 4B, the energy stored in the clip 62 will cause the clip 62 to move downwardly along the recess 64 to its normal position shown in FIG. 5 with the first and second ends 66 and 68 closely spaced. This will in turn cause the leading edge 74 of the clip 62 to move and project outwardly from the open end of the recess 64. At the same time, an inner surface of the clip 62, as shown in FIG. 4B, will be behind against the annular flange 50 on the endform 54 to prevent retraction of the endform 54 from the housing 12.

Figure 7:
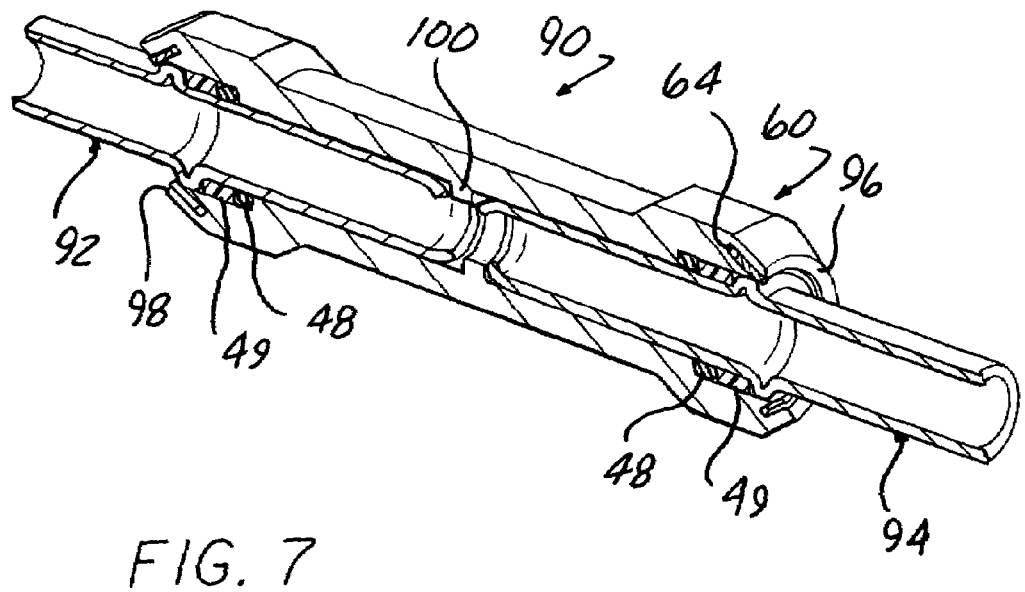
FIG. 7 is a longitudinal cross-sectional, perspective view of another aspect of the fluid quick connect of the present invention.

Referring now to FIG. 7 there is depicted the use of the retainer means 60 in a single point housing 90 designed to fluidly connect two tubular endforms 92 and 94, both of which are constructed substantially identical to the endform 54 in that each has an annular flange spaced from a tip end.

The housing 90 also includes two opposite, co-axial stepped bores extending between and first end 96 and an opposed second end 98. An optional annular, reduced diameter shoulder 100 is formed intermediate to the first and second ends 96 and 98 of the housing 90.

The first and second ends 96 and 98 of the housing 90 include the retainer means 60 described above and shown in FIGS. 1 and 5 to securely attach each endform to the housing 90.

Figure 8:
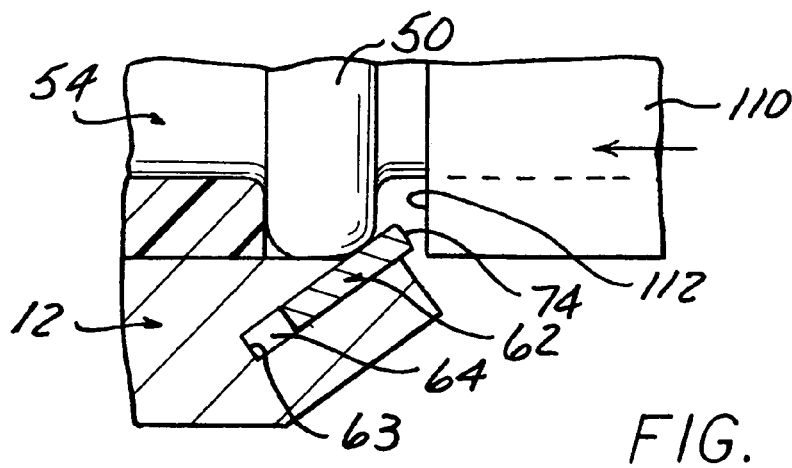
FIG. 8 is a longitudinal, cross-sectional view showing the operation of the release tool of the present invention.

Finally, a release tool 110 is shown in FIG. 8, for disengaging the endform 54 from the housing 12 or either of the endforms 92 and 94 from the housing 90. The release tool 110 is in the form a cylindrical member which may be premounted on each endform 54, 92 or 94 or applied after assembly of the endforms to the respective housing by means of a split formed in the release tool 110. A leading edge 112 of the release tool 110 may be formed with a flared outer diameter or as a simple flat edge having a diameter to engage and force the leading edge 74 of the clip 62 angularly outward into the recess 64 in the housing 12 a sufficient distant to allow the leading edge 74 to clear the outer diameter of the flange 50 on the endform 54, for example, and be withdrawn from the housing 12.

What is claimed is:

1. A method of manufacturing a high pressure quick connect comprising the steps of:
    forming a housing having a through bore extending from a first end;
    forming a conical surface in the housing adjacent to the first end of the housing, the conical surface defining an axially inner conical surface and an axially outer conical surface; and
    movably capturing a retainer on the axially outer conical surface of the housing so that the retainer is moveable along the axially outer conical surface from a first position by interference with an annular flange on an endform inserted through the first end of the housing to a second position on the conical surface by contact with the annular flange on the endform during insertion of the endform allowing passage of the annular flange past a leading edge of the retainer, the retainer moveable along the axially outer conical surface back to the first position after the annular flange on the endform has been inserted past the leading edge of the retainer to latch the endform in the housing.

2. The method of claim 1 further comprising the step of:
    forming the retainer as a conical body having a through aperture.

3. The method of claim 2 further comprising the step of:
    forming the retainer with a discontinuity in the conical body forming first and second circumferentially expandable ends in the body.

4. The method of claim 1 further comprising the step of:
    forming the recess as a conical recess.

5. The method of claim 1 further comprising the step of:
    mounting seal means in the bore of the housing for sealing the endform to the housing.

6. The method of claim 1 further comprising the step of:
    disposing a cylindrical sleeve disposed in the bore adjacent a seal member.

7. The method of claim 6 further comprising the step of:
    fixedly mounting the sleeve in the bore in the housing.

8. The method of claim 1 further comprising the steps of:
    forming the housing with an opposed second end;
    forming a second conical recess adjacent the second end of the housing;
    disposing a retainer in the second recess; and
    deforming the opposed end portion of the housing over the retainer to slidably capture the retainer in the second recess.

9. The method of claim 1 further comprising the step of:
    configuring a second end of the housing for mounting in a fluid operable device.

10. The method of claim 9 further comprising the step of:
    forming a plurality of threads adjacent to the second end of the housing for threaded mounting of the housing in the fluid operative device.

11. The method of claim 9 further comprising the step of:
    forming a conical surface on the second end of the housing for sealing mating engagement with a complimentary seat formed in a fluid operative device.

12. The method of claim 11 further comprising the step of:
    forming the conical seat externally on the second end of the housing.

13. The method of claim 11 further comprising the step of:
    forming the conical seat internally on the second end of the housing.

14. The method of claim 1 wherein the steps of capturing the retainer further comprises the steps of:
    inserting the retainer through an open first end of the housing; and
    deforming the first end of the housing over the retainer to form the first recess in the first end of the housing.

15. A method of manufacturing a high pressure quick connect comprising the steps of:
    forming a housing having a through bore extending from a first end;
    forming a first angular recess in the housing adjacent to the first end of the housing by forming a conical surface at the first end of the housing, forming an extension of the housing extending from the conical surface; deforming the extension to overlay the conical surface in a spaced relationship to form the first angular recess, the first recess communicating with the bore in the housing; and
    capturing a retainer in the first recess of the housing so that the retainer is moveable from a first position by interference with an annular flange on an endform inserted through the first end of the housing to a second position in the first recess by contact with the annular flange on the endform during insertion of the endform allowing passage of the annular flange past the leading edge of the retainer, the retainer moveable back to the first position after the annular flange on the endform has been inserted past the leading edge of the retainer to latch the endform in the housing.

16. The method of claim 15 wherein the step of capturing the retainer in the first recess comprises the steps of:
    disposing a retainer over the conical surface before the extension is deformed.

17. A method of manufacturing a high pressure quick connect comprising the steps of:
   forming a housing having a through bore extending from a first end;
   forming a conical surface in the housing adjacent to the first end of the housing;
   disposing a retainer over the conical surface;
   forming the housing with an extension spaced from the conical surface;
   deforming the extension of the housing over the retainer into a spaced relationship from the conical surface to form an annular recess in the housing capturing the retainer in the housing so that the retainer is movable from a first position by interference with an annular flange on an endform inserted through the first end of the housing to a second position in the recess by contact with the annular flange on the endform during insertion of the endform allowing passage of the annular flange past the leading edge of the retainer, the retainer moveable back to the first position after the annular flange on the endform has been inserted past the leading edge of the retainer to latch the endform in the housing.

* * * * *